Feb. 22, 1949. H. M. HUGE 2,462,322
FREQUENCY REDUCER
Filed April 8, 1947 2 Sheets-Sheet 1

INVENTOR.
HENRY MARTIN HUGE
BY Hoodling and Krost
ATTORNEYS.

INVENTOR.
HENRY MARTIN HUGE

BY Woodling and Krost
ATTORNEYS.

Patented Feb. 22, 1949

2,462,322

UNITED STATES PATENT OFFICE 2,462,322

FREQUENCY REDUCER

Henry M. Huge, Lorain, Ohio, assignor to Lorain Products Corporation, a corporation of Ohio Application April 8, 1947, Serial No. 740,149

15 Claims. (Cl. 172—281)

This invention relates to magnetic frequency reducers and in particular to an improved subharmonic generator which requires no device for producing a starting transient and which operates with increased efficiency and stability.

It is an object of my invention to provide a magnetic frequency reducer which requires no device for producing a starting transient to initiate the oscillations of the reduced frequency.

It is also an object of this invention to stabilize the output voltage of a frequency reducer.

Another object of this invention is to provide a starter for a subharmonic generator to eliminate the need for a starting relay.

A further object of this invention is to start the subharmonic oscillations in a subharmonic generator by means of a magnetic modulator energized by fundamental and subharmonic frequency and adapted to supply a capacitor with voltage of twice the subharmonic frequency.

Another object of this invention is to use a rectifier to supply biasing current to the magnetic frequency doubler and to energize the rectifier with a voltage varying in response to biasing requirements.

Still another object of my invention is to provide a subharmonic generator which is self-protecting against overloads and in which the oscillations are maintained in spite of heavy overloads.

An additional object of my invention is to supply a substantially constant subharmonic output voltage for normal loads and to supply a substantially constant current to overloads.

Another object of my invention is to combine a biased-core magnetic modulator with an unbiased saturable inductance in a frequency reducer.

Still another object of my invention is to utilize a biased-core magnetic modulator to start the oscillations of a subharmonic generator and to maintain the modulator in a relatively idle condition during normal operation of the subharmonic generator.

An additional object of my invention is to minimize the starting current of a subharmonic generator.

Other objects and a better understanding of my invention may be obtained from the following specification and claims together with the accompanying drawings, in which:

Figure 1:
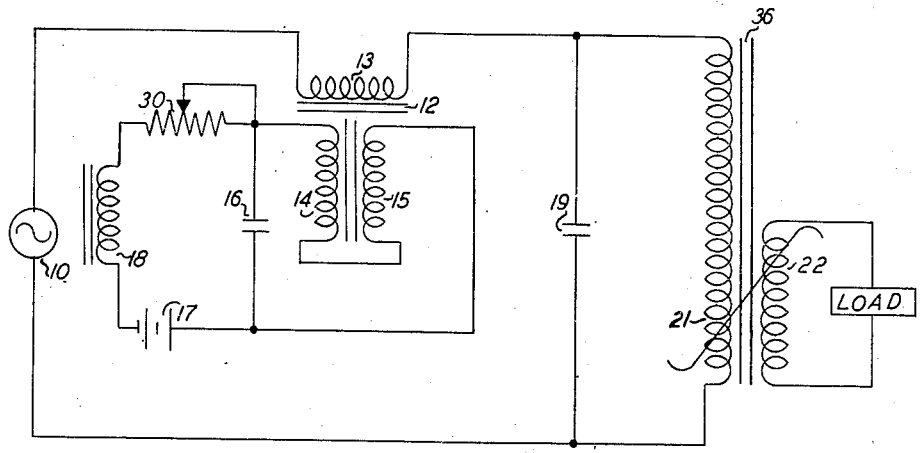
Figure 1 is the circuit diagram of a frequency changer made according to my invention showing a magnetic modulator connected in series with a capacitor with the capacitor shunted by a saturable inductance.
Figure 3:
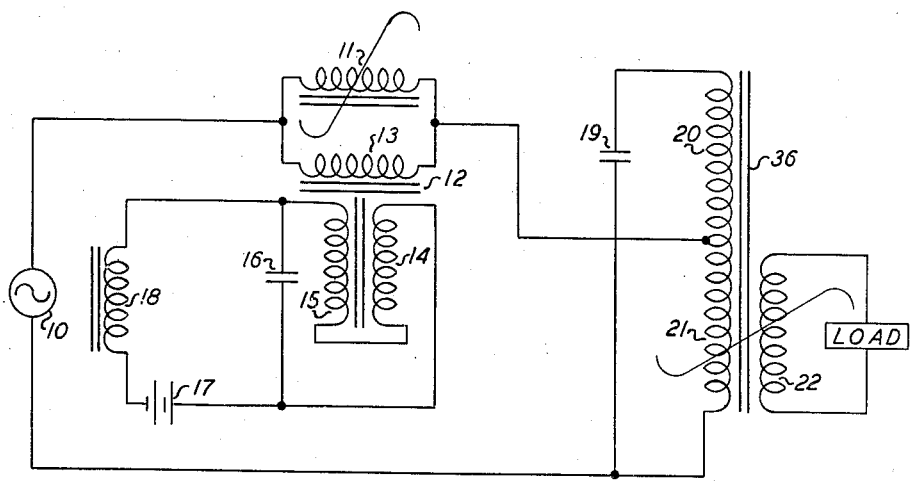
Figure 4:
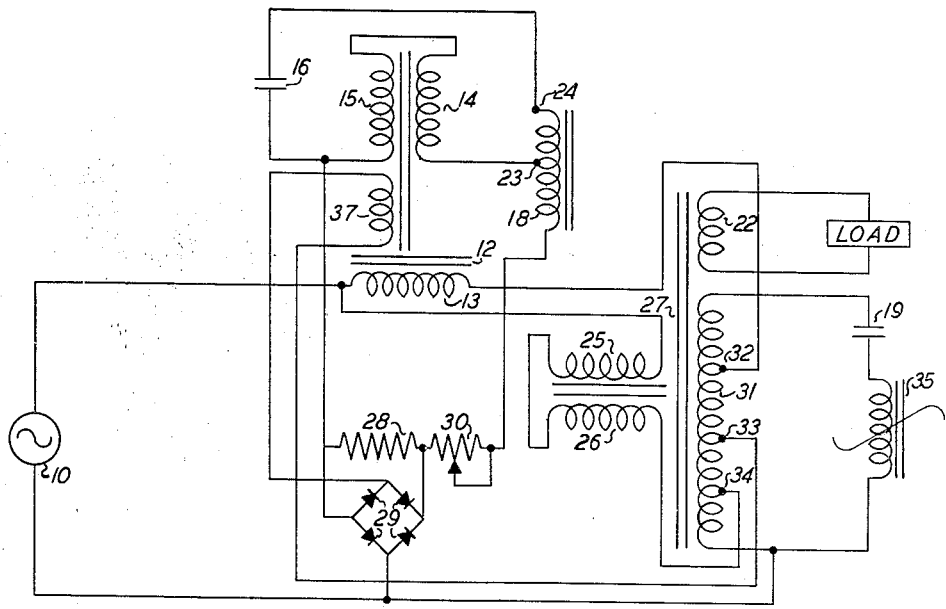

Figure 3 is another modification of Figure 1 in which the input branch of the magnetic modulator is shunted by another saturable inductance which can also exhibit a modulating action; and Figure 4 is the diagram of a preferred embodiment of my invention utilizing a three-legged saturable core in place of the two saturable inductances of Figure 3 and showing a method for supplying controlled biasing current from a drydisc rectifier bridge.

The present invention is an improvement on an arrangement disclosed in my U. S. Patent application, Serial No. 485,833, filed May 6, 1943, now United States Patent No. 2,418,641, in which a magnetic modulator is connected in series with a capacitor in a circuit energized from a source of alternating current. The circuit produces self-starting oscillations, for example, at one-third the energizing frequency, and, through the modulator which in this case also acts as a frequency doubler, at two-thirds the energizing frequency.

In Figure 1 of my present application, a series capacitor 19 is shunted by a saturable inductance winding 21 which acts to stabilize the oscillations and regulate the load voltage.

Specifically Figure 1 shows an alternating current source 10 supplying a winding 13 and the capacitor 19 in series with each other. The saturable inductance winding 21 is connected in parallel with the capacitor 19. The saturable core 36 on which winding 21 is wound also carries a load winding 22 for delivering the subharmonic output voltage to the load.

The winding 13 is the input winding to a magnetic modulator. The magnetic modulator comprises a three-legged magnetic core structure 12 shown symbolically by a T-shaped figure in which the stem of the T designates the two outside legs of the core and the crossbar of the T designates the center core leg. The input winding 13 is on the center member of the core and the windings 14 and 15 are respectively on the two outer members of the core. The windings 14 and 15 are polarized to provide a conjugate relationship between the input and output branches of the modulator, the input branch comprising winding 13 and the output branch comprising windings 14 and 15. Thus, when a voltage of a given frequency is applied to winding 13 the voltage of that frequency induced in winding 14 is normally equal and opposite to the voltage of that frequency induced in winding 15, so that the voltage across capacitor 16 is substantially free of any component of the frequency supplied to winding 13. The direct current source 17 supplies biasing current through inductance 18 to windings 14 and 15 to magnetize the outside legs of the three-legged core structure 12. The biasing current may be adjusted by means of the adjustable resistor 30 in series with the direct current source. In this manner the magnetic modulator is biased and the voltage induced in the output branch across capacitor 16 is in general an even harmonic of the voltage applied to the input branch comprising winding 13. In the simplest case the device acts as a frequency doubler and the voltage across capacitor 16 is of twice the frequency of the voltage supplied to winding 13.

The combination of the magnetic modulator loaded by capacitor 16 on its output side and energized through capacitor 19 on its input side produces a negative resistance at a frequency which is a subharmonic of the frequency of source 10 and oscillations at this frequency are therefore started. The oscillations build up to a value limited by the non-linearity of the modulator and also by the saturation of the core 36 which causes the winding 21 to draw a greatly increased exciting current as the voltage builds up to its normal value. The voltage across capacitor 19 and winding 21 is chiefly of the subharmonic frequency, and consequently, the load winding 22 wound on the core 36 supplies the load with a relatively pure subharmonic voltage. Furthermore, because of the saturation of the core 36, the voltage supplied to the load is regulated and maintained at its normal value in spite of variations in operating conditions.

The voltage across the input winding 13 of the magnetic modulator includes a component of the subharmonic frequency and a component of the source frequency. The output branch of the magnetic modulator including capacitor 16 and inductance 18 is proportioned to favor the excitation of voltage of an even harmonic of the subharmonic frequency. In order to provide the required negative resistance to the subharmonic frequency, the output branch of the modulator should be proportioned to favor oscillations of a frequency equal to the difference between the source frequency and the subharmonic frequency. For example, if the subharmonic is one-third the source frequency, then the oscillations through capacitor 16 are of two-thirds the source frequency. The negative resistance to the subharmonic frequency is accompanied by a negative resistance in the output branch of the modulator to the frequency which is equal to the difference between the source frequency and the subharmonic frequency. The oscillations of these two frequencies are termed mutually self-exciting because the losses at either one of the frequencies of oscillation are reflected through the modulator as negative resistance at the other frequency of oscillation.

Figure 2:
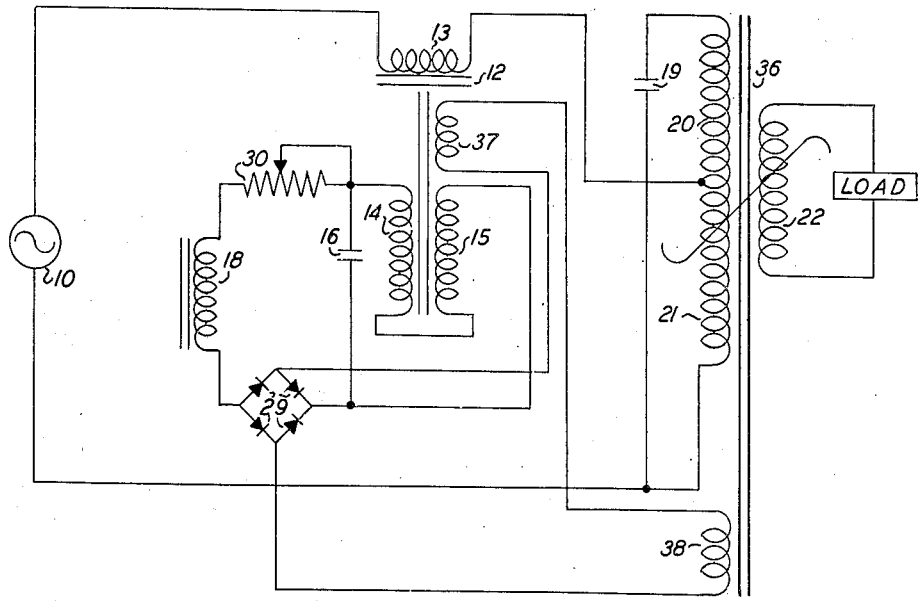
Figure 2 is a modification of Figure 1 in which the saturable inductance windings are used to step up the voltage to the capacitor and in which a rectifier bridge is used to supply biasing current to the magnetic modulator.

The circuit arrangement shown in Figure 2 differs from that of Figure 1 chiefly in the method of obtaining the biasing current. Figure 2 also shows the saturable inductance 21 as being provided with a step up winding 20 which supplies an increased voltage to the capacitor and per- mits the use of a smaller capacitor for economical reasons. The effect of this portion of the circuit is substantially the same as in Figure 1, that is, it acts as a capacitor in series with the winding 13 energized from the source 10. The capacitor 19 is shunted by the saturable inductance, in this case comprising the windings 20 and 21.

The method of supplying direct current to the windings 14 and 15 in Figure 2 makes use of a dry-disc rectifier bridge 29 energized from the windings 37 and 38 in series. The winding 38 wound on the core 36 supplies subharmonic voltage. The winding 37 wound on the one outer leg of the core 12 is, because of its location, coupled to both the input and output branches of the magnetic modulator. The voltage across winding 37, therefore, includes components of the source frequency, the subharmonic frequency, and also of the frequency appearing across capacitor 16. I prefer to polarize the windings 37 and 38 so that the subharmonic voltages in these two windings oppose, though not necessarily cancel, each other. One outstanding advantage of this method of supplying biasing current is that it maintains a relatively constant A. C. voltage across the rectifier bridge 29 in spite of variations in the voltage of source 10. In this manner a condition of excessive biasing current for high source voltages is avoided.

The operating principles of the circuit of Figure 2 are similar to the principles already explained in connection with Figure 1 and the arrangement of Figure 2 provides a subharmonic voltage across the load winding 22 and maintains the voltage in spite of variations in the operating conditions. As in Figure 1, the subharmonic oscillations are self-starting and require no transient producing device to initially disturb the circuit for the production of subharmonic oscillations.

The circuit of Figure 3 differs from the circuit of Figure 2 chiefly by the addition of a saturable inductance 11 in Figure 3 in parallel with the input winding 13 of the magnetic modulator. The direct current source 17 in Figure 3 is shown symbolically as in Figure 1, but it will be recognized that this symbol may represent the biasing arrangement shown in Figure 2. An inspection of the portion of the circuit of Figure 3 not including the biased magnetic modulator indicates that this portion of the circuit is essentially the same as the circuits shown in U. S. Patent 2,088,618 issued August 3, 1937, to C. P. Stocker. This portion of the circuit of Figure 3 is capable of sustaining subharmonic oscillations if they are once started, and it therefore, may be referred to as a "subharmonic generator."

In the Stocker device a transient-producing device is used to start the subharmonic oscillations, but in my invention the oscillations are self-starting and my frequency reducer requires no starting relay or other transient-producing arrangement. The subharmonic oscillations in the circuit of Figure 3 are started in the same manner as in the circuits of Figures 1 and 2, that is, by the action of the magnetic modulator in producing a negative resistance to the subharmonic frequency in its input branch at the same time that it produces a negative resistance to a harmonic of the subharmonic frequency in its output branch.

Under the starting conditions there is not sufficient voltage in the circuit to saturate the inductance 11 and it therefor has little effect during starting. Once the oscillations have reached their normal value or steady state operating conditioning the inductance 11 becomes saturated by the combination of the voltage from source 10 and the subharmonic voltage. Under the steady-state condition, the inter-action of these voltages in the saturable inductance 11 produces a modulation effect which converts power from the source frequency to the subharmonic frequency just as in the Stocker device. In fact the winding 13 in Figure 3 may be open-circuited once the oscillations are started without stopping the oscillations. In this case the action of the magnetic modulator is to start the oscillations and to maintain them under overload conditions.

The circuit of Figure 3 utilizes two types of magnetic modulating action, one being for starting the oscillations and the other being for maintaining them. The starting action is obtained in a biased-core modulator with conjugate input and output branches which is effective for starting the oscillations. The saturable inductance 11 is used to produce the second or maintaining modulating action after the oscillations are started and it is capable of converting power from the source frequency along with the power which is converted by the biased modulator. The use of the biased modulator in combination with the unbiased saturable inductance which acts as a second modulator is a novel feature of my invention which makes possible results hitherto unobtainable.

The embodiment of my invention shown in the circuit of Figure 4 employs a second three-legged reactor, the core of which is indicated symbolically by a T-shaped figure designated by the reference character 27. The winding 25 is on the one outside leg, the winding 26 on the other outside leg of the three-legged core, and the windings 22 and 31 are on the central leg of the saturable core 27.

The windings 25 and 26 are connected in series with each other and with a portion of winding 31 terminated at the tap 34. This series circuit is connected to the source 10. Capacitor 19 in series with the small saturable inductance 35 is connected across the winding 31. This portion of the circuit of Figure 4 is essentially the same as the circuit of Figure 2 of my U. S. Patent 2,384,171 issued September 4, 1945, which is a frequency changer for supplying a subharmonic output frequency, except that in Figure 4 of my present application, the starting relay is omitted. This portion of the circuit of Figure 4 may therefore be called a "subharmonic generator" since it is capable of maintaining subharmonic oscillations if they are once started.

The subharmonic oscillations in my present invention are started without the use of a relay or other transient-producing arrangement. My frequency reducer therefore does not require a high starting current as does a relay-started device or a motor-generator set. In fact my frequency reducer requires only slightly more current to start the oscillations than it requires in operation on a heavy load. As in Figure 1, the oscillations in the circuit of Figure 4 are started by the application of a self-excitation principle involving the subharmonic frequency, the source frequency, and a third frequency which is an even harmonic of the subharmonic frequency. In order for the oscillations to be self-starting in the circuit of Figure 4 the sum of the subharmonic frequency and the even harmonic frequency should equal the source frequency; thus the subharmonic frequency may be one-third the source frequency and the even harmonic frequency two-thirds the source frequency.

In order to operate as described, the circuit of Figure 4 includes a magnetic modulator whose input circuit comprising winding 13 is connected across a portion of the subharmonic generator circuit across which there appears in operation voltage of the source frequency and also subharmonic voltage. In Figure 4 the input winding 13 of the modulator is connected on one side to source 10 and on the other side to tap 32 on winding 31. The modulating action of the magnetic modulator together with the subharmonic generator circuit described above produces a negative resistance to the subharmonic frequency appearing in winding 13 and simultaneously produces a negative resistance to the even harmonic of the subharmonic frequency appearing in windings 14 and 15. The oscillations are thus built up to a stable or running value as in the circuit of Figure 1.

The circuit through which the input winding 13 of the magnetic modulator is energized in Figure 4 is similar to that in Figure 3, and includes besides winding 13 a portion of winding 31 in series which is shunted by the capacitor 19. The circuit may therefore be considered to be effectively a magnetic modulator in series with a capacitor, the capacitor being shunted by the saturable inductance winding 31. The circuit operation is converted from the starting to the running condition by the current flowing through the windings 25 and 26. The current through windings 25 and 26 in Figure 4 may be considered as functionally equivalent to the current through winding 11 in Figure 3, and magnetizes the core 27 to provide the second or maintaining modulating action as explained in connection with Figure 3.

The magnetic modulator in Figure 4 is essentially the same as that in Figure 2, and comprises the three-legged magnetic core structure shown symbolically and designated by the reference character 12. The input winding 13 is on the central member of the three-legged core and the output windings 14 and 15 are respectively on the two outer core members. There exists a conjugate relationship between the input and output windings of the modulator as previously described. It will be apparent to those skilled in the art that, because of the conjugate relationship, the input and output sides of the arrangement are interchangeable, and that other conjugate magnetic modulating arrangements such as those shown in my U. S. Patent application Serial No. 485,833, now United States Patent No. 2,418,641, may be used in the practice of my invention.

The magnetic modulator in Figure 4 is capacitively loaded by the capacitor 16 substantially across the output windings 14 and 15. The inductance 18 which is substantially in parallel with the capacitor 16 through the rectifier bridge 29 normally has a higher impedance than capacitor 16 at the frequency at which this portion of the circuit operates, so that the effect of capacitor 16 predominates.

One of the functions of the inductance 18 is to provide a path for the biasing current supplied by the rectifier bridge 29 to the windings 14 and 15, and to limit the flow of alternating current through the direct-current side of the rectifier 29. The purpose of the rectifier 29 is to supply direct current to the windings 14 and 15 to bias the core 12 as explained in connection with the previous figures. The adjustable series resistor 30 may be used to adjust the direct current to the desired value and the shunt resistor 28 likewise exerts some control over the magnitude of the biasing current.

The influence of the resistor 28 in controlling the rectified current is exerted principally on the component of current which results from the flow of alternating current through the inductance 18. This alternating current causes the rectifier bridge to act as a half-wave rectifier whenever the alternating current crest exceeds the direct current. In this case, the flow of alternating current in one direction is blocked or limited by the reverse resistance of the rectifier bridge 29, with the resistor 28 in parallel with this reverse resistance. The resistor 28 thus becomes most effective when the voltage across capacitor 16 is large, whereas the resistor 30 is most effective in controlling the rectified current resulting from the application of voltage to the A. C. side of the rectifier bridge.

The A. C. side of the rectifier bridge 29 is energized from winding 37 on the one outer leg of the three-legged core 12 and also from a portion of winding 31 on core 27. Winding 37 is connected in series with a portion of winding 31 terminated at tap 33 and the rectifier is thus supplied with voltage from the magnetic modulator and also from the subharmonic generator. This arrangement is essentially the same as that of Figure 2. As previously explained, the voltage across winding 37 has components of the source frequency, the subharmonic frequency, and of the frequency produced in the output side of the modulator, which is the difference between the source frequency and the subharmonic frequency.

The alternating voltage supplied to the rectifier bridge 29 is of the source frequency until the oscillations start, after which it includes components of the subharmonic frequency and of the other frequency produced by the modulator.

I have found that this method of supplying biasing current is highly effective in maintaining a closely regulated subharmonic voltage across the load winding 22 for all normal values of load impedance and over a wide range of voltage variations of source 10.

The operation appears to be somewhat as follows:

The capacitor 16 is large enough so that at the frequency produced by the modulator, the capacitive reactance is lower than the reactance of the inductance 18. In fact I prefer to make the capacitor 16 large enough to capacitively detune the output branch of the modulator in normal operation. This detuning is sufficient to keep the voltage across capacitor 16 at a low level during normal operation. In this way the modulator is kept in a relatively idle condition and its losses are reduced to a minimum during normal operation. It should be pointed out that the modulator is responsive not only to the circuit reactance and resistance in its output branch, but also to the circuit reactance and resistance in its input branch, which includes the load circuit as well as the circuit of capacitor 19.

I have found that under the circuit conditions described above, the application of load to the load winding 22 tends to increase the voltage of the modulation product across capacitor 16. An increase in this voltage results in an increase in the voltage across winding 37 and hence in an increase in the direct current supplied by the rectifier bridge 29. At the same time, an increase in the voltage across capacitor 16 and inductance 18 increases the alternating current through inductance 18 which may be rectified by the bridge 29 acting as a half-wave rectifier.

Both of these effects result in an increased biasing current through windings 14 and 15 and inductance 18. The increased biasing of the magnetic modulator reduces the self-inductance of its windings, and at the same time, the increased direct current through inductance 18 tends to reduce its inductance. I prefer to construct the core of inductance 18 with a nonmagnetic gap to avoid excessive saturation of the core, but it is nevertheless influenced by the amount of direct current through the inductance winding.

Both of these effects tend to tune the modulator circuit toward the condition of maximum voltage, because, as previously mentioned, the initial circuit values provide excessive capacitance. The circuit condition is cumulative, so that the higher the voltage rises across capacitor 16, the more tendency there is for it to increase. My frequency changer utilizes the action to change the modulator from a relatively idle condition at normal loads to a highly active condition under overloads.

Thus I am able to cause a gradual shift in the frequency changing action from the modulator under starting and overload conditions to the unbiased-core frequency changer under normal load conditions. There are actually two current paths between the source 10 and the capacitor 19, one through the input branch of the modulator, the other through the windings on the unbiased saturable magnetic core, which in Figure 4 are the windings 25 and 26. Both of these paths carry subharmonic current but the division of current is controlled by the condition of the modulator, which is, in turn, determined by the load across winding 22.

To utilize this characteristic to its full extent I prefer to construct the inductance 18 with a relatively small air gap in its core, so that its reactance can be controlled by the direct current through its winding or by the alternating current through its winding. Under some conditions, I have found it advantageous to construct the inductance 18 with a compound air gap in its core so that the one portion of the core is more readily influenced by the biasing current than the other portion of the core.

In order to adjust the circuit to the desired operating characteristics, the inductance 18 may be provided with taps such as taps 23 and 24, the connections being made to whichever taps provide the required operation. Further adjustments may be made by means of the adjustable resistor 30 or by the selection of a suitable value for resistor 28, when these resistors are included in the circuit. In many cases, the resistors 28 and 30 may be omitted and the adjustments completed by other means, but I prefer to include the resistor 28 in parallel with the rectifier in order to minimize the effects of changes in the rectifier blocking resistance produce by aging of the rectifier or by changes in temperature.

Changes in temperature may also produce appreciable changes in the resistance of the windings 14, 15 and 18 which may change the biasing current sufficiently to shift the operation of the modulator. In order to correct for these variations, the series resistor 30 may be provided with a negative temperature coefficient or the resistor 28 with a positive temperature coefficient. The normal temperature coefficient of the dry-disc rectifier bridge 29 provides some compensation, but it may be necessary to utilize the temperature coefficients of the resistors 28 and 30.

Further compensation for the effects of temperature may be provided by the use of a capacitor 16 having a negative temperature coefficient, that is, one whose capacity decreases with increasing temperature.

With the circuit operating as described, I am able to maintain a closely regulated load voltage across winding 22 over a wide range of voltages from source 10 and for all normal values of load impedance. When the load impedance drops below the normal range of values, calling for an overload current, the magnetic modulator operates to supply the overload current and at the same time to gradually reduce the output voltage. As the load demands increase, the output voltage is reduced more rapidly to limit the power within the capacity of the frequency reducer.

The circuit elements may be adjusted to provide a substantially constant voltage for normal load impedances and a substantially constant current over a wide range of load impedances below the normal range. This highly desirable characteristic has been unattainable in prior frequency reducers. It keeps the frequency reducer in operation even though the load impedance drops far below normal and eliminates the need for any overload protective devices.

The small saturable inductance 35 in series with the capacitor 19 is used to introduce high order harmonics into the load voltage across winding 22. These harmonics are frequently required when the output is used for telephone ringing current in order to provide what is known as "reverting tone."

As previously mentioned, the three-legged saturable magnetic core structure 27 together with the windings thereon and the capacitor 19 comprises a subharmonic generator capable of sustaining subharmonic oscillations once they are started. The conversion of power from the source frequency to the subharmonic frequency is accomplished in the saturable core 27 in much the same manner as in the saturable inductance 11 in Figure 3. The circuit of Figure 4 therefore produces a modulating action in an unbiased saturable core comparable to that produced by the saturable inductance 11 in Figure 3. Figure 4 also includes the biased modulator which is also shown in Figures 1, 2 and 3. The biased modulator is used in starting the oscillations and is not necessarily used to full capacity during the normal operation of the frequency reducer, but provides reserve power for overload conditions and produces the desirable overload characteristic previously described.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. In combination, a subharmonic generator and a magnetic modulator, said subharmonic generator comprising saturable magnetic core means, winding means on the core means, a first capacitor connected in a closed circuit with at least a portion of said winding means, means for energizing said winding means from an alternating current source, said magnetic core means, winding means and first capacitor being adapted to maintain oscillations of one-third the frequency of said source in the closed circuit including said first capacitor, said magnetic modulator comprising input and output branches in conjugate relationship to each other, a second capacitor connected in a closed circuit in said output branch, and means for connecting said input branch across at least a portion of said winding means across which there appears voltage of the source frequency and of one-third the source frequency, whereby oscillations of two-thirds the source frequency are produced in said output branch, said magnetic modulator cooperating with said subharmonic generator to start the said oscillations of one-third the source frequency.

2. In combination, a magnetic subharmonic generator, a biased-core modulator, means for energizing said subharmonic generator from an alternating-current source, and circuit means for connecting said modulator to said subharmonic generator, said biased-core magnetic modulator cooperating with said subharmonic generator to initiate subharmonic oscillations in said generator, said circuit means connecting said modulator across a portion of said subharmonic generator across which there appears subharmonic voltage and voltage of the frequency of said source, said modulator including a capacitor energized with a frequency which is an even harmonic of said subharmonic, the sum of said subharmonic frequency and said even harmonic frequency equalling the source frequency.

3. A frequency reducer comprising in combination, a magnetic modulator having input and output circuits in conjugate relationship, a first capacitor, a second capacitor, a saturable inductance, a source of direct current, and circuit means adapted to be energized from a source of alternating current and including said input circuit and said first capacitor in series, said second capacitor and said source of direct current being connected in said output circuit, said magnetic modulator cooperating with said first capacitor to produce oscillations of one-third the frequency of said source through said first capacitor and oscillations of two-thirds the frequency of said source through said second capacitor, said saturable inductance being connected in parallel with said first first capacitor to stabilize the voltage across said capacitor.

4. In combination, a magnetic modulator, a first capacitor, a second capacitor, a source of direct current, a saturable magnetic core, a winding on said core, said magnetic modulator having input and output branches in conjugate relationship to each other, circuit means adapted to be energized by a source of alternating current and including the input branch of said modulator and at least a portion of said winding in series, said first capacitor being connected in a closed circuit with said winding, said second capacitor being connected in the output branch of said modulator, said source of direct current being connected in the output branch of said modulator, the input branch of said modulator when energized by said source presenting a negative resistance to current of a frequency which is a subharmonic of the source frequency to initiate oscillations of the subharmonic frequency in said circuit means and oscillations of a multiple of said subharmonic frequency through said second capacitor.

5. In combination, a subharmonic generator, a magnetic modulator, means for energizing said generator from a source of alternating current, means for connecting said modulator across a portion of said subharmonic generator across which there exists in operation voltage of the source frequency and of a subharmonic frequency, means for magnetically biasing said magnetic modulator, and a capacitor connected to said modulator, said modulator cooperating with said generator to initiate oscillations in said generator of a frequency which is a subharmonic of the source frequency, and oscillations across said capacitor of a frequency which is a multiple of said subharmonic and equal to the source frequency minus the subharmonic frequency.

6. In combination, a subharmonic generator, a magnetic modulator, means for energizing said generator from a source of alternating current, said magnetic modulator comprising input and output branches in conjugate relationship, means for connecting said input branch across a portion of said subharmonic generator across which there exists in operation voltage of the source frequency and of a frequency which is a subharmonic of the source frequency, and reactance means connected in the output branch of said magnetic modulator, said magnetic modulator producing in its input branch a negative resistance to said frequency which is a subharmonic of the source frequency.

7. In combination, a biased-core magnetic modulator, an unbiased magnetic core with winding means thereon, a first capacitor and a second capacitor, said biased-core magnetic modulator comprising input and output branches in conjugate relationship to each other, first circuit means for energizing said first capacitor from a source of alternating current through the input branch of said biased-core magnetic modulator, second circuit means for energizing said first capacitor from said source through said winding means, said second capacitor being connected in said output branch and cooperating with said biased core modulator and said first capacitor to produce in said input branch a negative resistance to current of a frequency which is a subharmonic of the frequency of said source and to produce in said output branch a negative resistance to current of a frequency which is a multiple of said subharmonic frequency.

8. In combination, a subharmonic generator, a magnetic modulator, a capacitor, a rectifier, an inductance, said magnetic modulator comprising input and output branches in conjugate relationship to each other, first circuit means for energizing said subharmonic generator from a source of alternating current, second circuit means for connecting said input branch across a portion of said subharmonic generator across which there appears voltage of the source frequency and of a subharmonic frequency, third circuit means for connecting said capacitor across said output branch, fourth circuit means for connecting said inductance in series with said rectifier across said output branch to supply direct current to said output branch, and fifth circuit means for energizing said rectifier with alternating current from said input branch and said output branch and from said subharmonic generator, said magnetic modulator producing in its input branch a negative resistance to current of said subharmonic frequency.

9. In combination, a subharmonic generator, a magnetic modulator, a capacitor, first circuit means for energizing said subharmonic generator from a source of alternating current, said magnetic modulator comprising input and output branches in conjugate relationship to each other, said subharmonic generator being adapted to maintain oscillations of a frequency which is a subharmonic of the source frequency and to supply subharmonic voltage to a load, second circuit means for connecting said input branch across a portion of said subharmonic generator across which there exists in operation a voltage of the source frequency and a voltage of the subharmonic frequency, said capacitor being connected in said output branch, means for supplying direct current to said output branch, and means for varying said direct current in response to variations in the load on said subharmonic generator.

10. In combination, a subharmonic generator, a magnetic modulator connected to said subharmonic generator, means for energizing said subharmonic generator from a source of alternating current, means for producing in said magnetic modulator a negative resistance to a subharmonic frequency to start said subharmonic generator, and means responsive to the output of said subharmonic generator for rendering said modulator relatively inactive during the normal operation of said generator.

11. In combination, a subharmonic generator, a magnetic modulator having input and output branches in conjugate relationship, a capacitor connected in said output branch, means for energizing said subharmonic generator from a source of alternating current, said modulator producing in said input branch a negative resistance to a subharmonic frequency to start said subharmonic generator, means for supplying direct current to said output branch, and means for controlling said direct current to render said modulator relatively inactive after said generator is started.

12. In combination, a subharmonic generator, a magnetic modulator having input and output branches in conjugate relationship, said generator including a saturable magnetic core with at least one winding on said core, a closed circuit including said winding and the input branch of said modulator, means for producing in said input branch a negative resistance to a subharmonic frequency to start said subharmonic generator, and means for varying the reactance of said output branch to render said modulator relatively inactive during the normal operation of said subharmonic generator.

13. In combination, a capacitor, a magnetic modulator, a saturable magnetic core with winding means thereon, first circuit means for energizing said capacitor from an alternating current source through said winding means, second circuit means for energizing said capacitor from said source through said modulator, means for producing in said modulator a negative resistance at a frequency which is a subharmonic of the source frequency, whereby subharmonic current is caused to flow through said first and second circuit means, and means for controlling said modulator to shift a portion of the subharmonic current in the second circuit means to the first circuit means.

14. A frequency reducer comprising in combination, a magnetic modulator having input and output branches in conjugate relationship, a first capacitor, a second capacitor, a saturable magnetic core, winding means on said core, said first capacitor being connected in a closed circuit with at least a portion of said winding means, a circuit adapted to be energized from a source of alternating current and including said input branch and at least a portion of said wind means, said second capacitor being connected in said output branch, and means for supplying direct current to said output branch, said input branch exhibiting a negative resistance to a frequency which is a subharmonic of the source frequency and said output branch a negative resistance to a frequency which is the difference between the source frequency and the subharmonic frequency.

15. In combination, a subharmonic generator, a magnetic modulator, means for energizing said subharmonic generator from a source of alternating current, said magnetic modulator comprising input and output branches in conjugate relationship, means for producing in said input branch a negative resistance to a subharmonic frequency to start said subharmonic generator, a source of direct current connected to a direct-current path including said output branch, and temperature-responsive means in said output branch for compensating for temperature-responsive changes in the resistance of said direct-current path.

HENRY M. HUGE.

No references cited.